United States Patent [19]
Jacobellis

[11] 3,962,956
[45] June 15, 1976

[54] HYDROPNEUMATIC VALVE ACTUATOR

[75] Inventor: Alphonse A. Jacobellis, Woodland Hills, Calif.

[73] Assignee: Greer Hydraulics, Inc., Los Angeles, Calif.

[22] Filed: Nov. 19, 1974

[21] Appl. No.: 525,203

[52] U.S. Cl. ................................. 91/418; 92/5 R; 92/82; 92/86; 92/112; 92/134
[51] Int. Cl.² .................... F15B 11/08; F15B 13/04; F15B 21/04
[58] Field of Search .................. 92/5 R, 82, 86, 112, 92/134; 91/1, 5, 418

[56] References Cited
UNITED STATES PATENTS

| | | | |
|---|---|---|---|
| 2,679,827 | 6/1954 | Perdue | 92/134 X |
| 2,807,021 | 9/1957 | Chellis | 92/134 X |
| 3,063,423 | 11/1962 | Riordan | 92/86 X |
| 3,078,065 | 2/1963 | Vickery | 92/134 X |
| 3,248,879 | 5/1966 | Natho | 92/134 X |
| 3,316,817 | 5/1967 | Ellis | 92/82 X |
| 3,531,065 | 9/1970 | Brown | 92/134 X |
| 3,704,652 | 12/1972 | Hoenick | 92/86 X |
| 3,815,481 | 6/1974 | Pauliukonis | 92/86 |

FOREIGN PATENTS OR APPLICATIONS

| | | | |
|---|---|---|---|
| 1,475,871 | 1/1969 | Germany | 92/82 |
| 1,807,788 | 2/1971 | Germany | 92/134 |
| 1,143,003 | 2/1969 | United Kingdom | 92/134 |

*Primary Examiner*—Martin P. Schwadron
*Assistant Examiner*—Abraham Hershkovitz
*Attorney, Agent, or Firm*—Arthur B. Colvin

[57] ABSTRACT

This invention relates to a hydropneumatic valve actuator comprising an outer cylindrical casing and an inner cylindrical casing both having closure means at each end. The inner cylindrical casing is positioned in said outer casing and is transversely spaced therefrom to define an elongated annular gas chamber. A piston slidably mounted in said inner casing has a piston rod extending axially from one end thereof through an axial bore in one of said closure means. The gas chamber as well as the portion of the inner casing between the piston and the other closure means, are adapted to be charged with gas under pressure and the portion of the inner casing between the piston and the closure means through which the piston rod extends is adapted to be charged with liquid.

The piston is provided with a pair of spaced annular seals and means are provided to prevent gas leakage past one of the seals into the portion of the inner casing charged with oil under pressure and to sense leakage of oil past the other seal.

9 Claims, 1 Drawing Figure

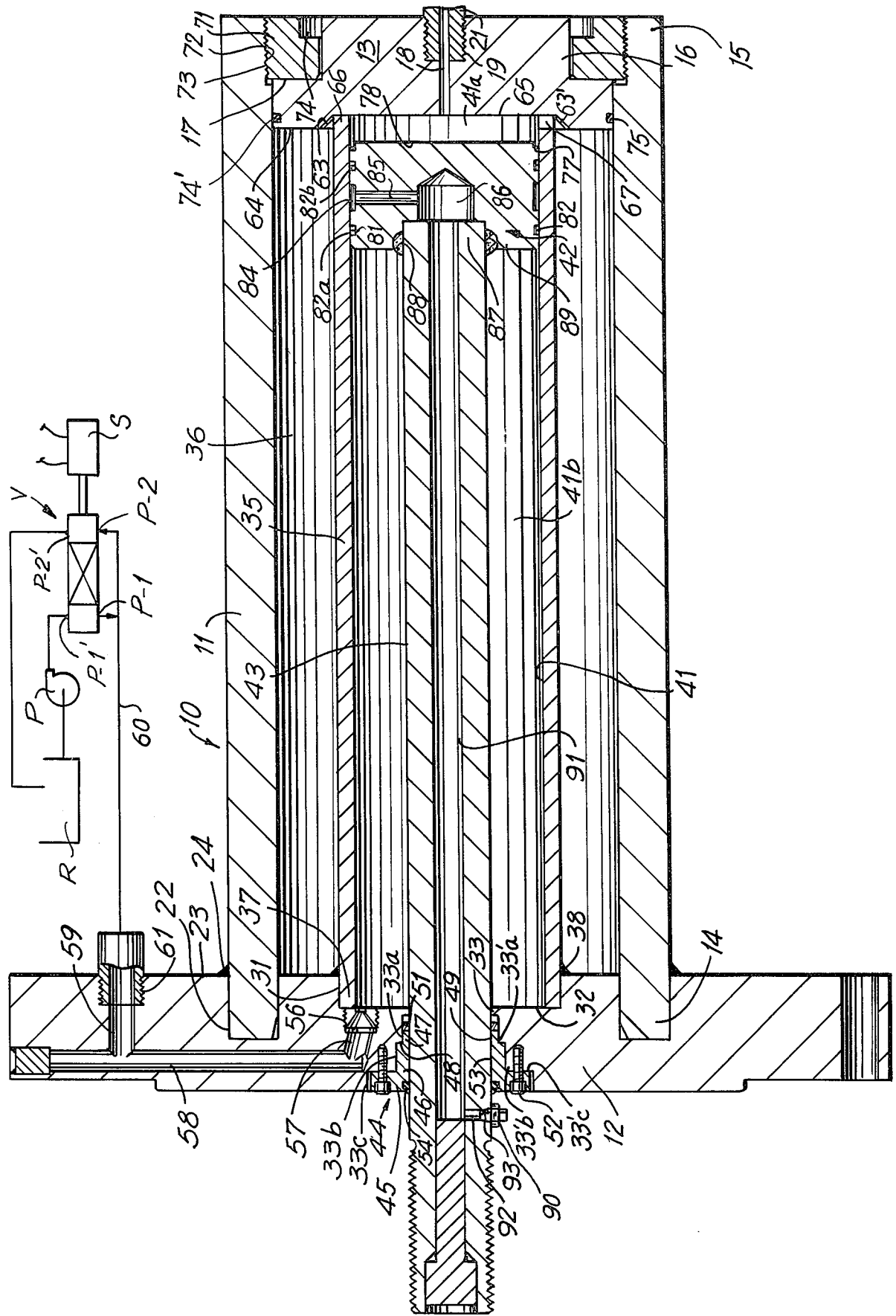

HYDROPNEUMATIC VALVE ACTUATOR

As conducive to an understanding of the invention, it is to be noted that where, for example, a large valve having a longitudinally movable valve stem is to be actuated to cut off fluid flow through the valve, depending upon the size of the valve a correspondingly large force must be exerted against the valve stem dependably and rapidly to close the valve.

Where it is desired that a "fail-safe" installation be provided so that in the event of a failure in the system in which the valve is incorporated the valve will close rapidly regardless of electric power failure, electrically driven motors responsive to system failure would not provide the desired security. If storage batteries were used to actuate the motor, due to the large forces required to actuate a large valve, the electric motor would have to be extremely large and a large bank of storage batteries would be required. Apart from the bulk of such type of installation, the heavy currents involved would be dangerous in many applications.

Where springs are utilized to actuate the longitudinally movable valve stem, due to the large forces required, a number of heavy duty springs would have to be employed and they would have to be of relatively great length to furnish the forces required. As a result, in order to "cock" the springs so that they are in compressed condition, actuators, either hydraulic or pneumatic, would have to be provided. As a result, the assembly would be extremely bulky and of great weight, particularly if utilized to actuate a large valve.

In addition, where the valve has a longitudinally movable valve stem, and due to space considerations, the spring type actuating assembly is mounted so as to extend parallel to the valve stem and more particularly longitudinally of the valve stem, the overall length of the combined valve and spring actuating assembly would be relatively great, especially when the valve is of large size, say 16 inches or 32 inches. As a result, if the installation should be subjected to seismic shocks, due to the length of the combined valve and spring actuating assembly, oscillations would build up with resultant breakdown of the system so that it would become inoperative, with the result that the valve could not be closed.

It is accordingly among the objects of the invention to provide a valve actuator which is relatively simple in construction and which may readily be incorporated with the longitudinal valve stem of a valve to provide a linear force to actuate the valve stem to close said valve and which though capable of exerting relatively great force, is relatively compact in size and not likely to become deranged even if the installation in which it is incorporated is subjected to relatively severe seismic shocks.

According to the invention the valve actuator comprises a cylindrical outer casing and cylindrical inner casing, both having closure means at each end. The inner cylindrical casing is positioned in the outer casing and is transversely spaced therefrom to define an elongated gas chamber. A piston slidably mounted in said inner casing has a piston rod extending axially from one end thereof through an axial bore in one of said closure means. The gas chamber as well as the portion of the inner casing between the piston and the other closure means are adapted to be charged with gas under pressure and the portion of the inner casing between the piston and the closure means through which the piston rod extends is adapted to be charged with liquid under pressure.

In a system using an actuator of the above type, the valve is normally in open position with the valve stem extended and the actuator is in charged condition ready to exert the required force to close the valve.

Since the valve is basically a safety valve which remains open unless there is a failure in the system, it is essential that the actuator remain charged, even if it is standing inactive for relatively long periods, so that at all times it will be ready to provide the actuating force required.

For this purpose, in order to provide a seal between the piston and the wall surface of the inner casing, the piston carries two spaced annular sealing members. This normally will prevent mixing of the gas and liquid under pressure on opposed sides of the piston which would cause a pressure drop with resultant reduction of the force available to close the valve.

Even with the provision of the sealing members, it is possible that due to the long periods the actuator is inactive, leakage may occur with resultant reduction in pressure.

In order to insure that at all times an attendant can be warned of such pressure drop, means are provided to prevent gas leakage past one of the seals into the portion of the inner casing charged with oil under pressure and to sense leakage of oil past the other seal.

In the accompanying drawing in which is shown one of the various possible embodiments of the several features of the invention the single FIGURE is a longitudinal sectional view of the device.

Referring now to the drawing, the device 10 comprises a cylindrical outer casing 11 having closure members 12, 13 secured to the respective ends 14 and 15 thereof.

More particularly, the closure member 13 is a cylindrical plug of reduced diameter at its outer end as at 16 defining an annular shoulder 17, the plug having an axial bore 18, the outer end of which defines a gas charging port 19 to receive a gas charging valve 21.

The closure member 12 is a plate having an annular recess 22 in its inner surface 23 to receive the end portion 14 of outer casing 11, the latter being secured in fixed position as by welding at 24 which also defines a seal.

The plate 12 has a cylindrical axial recess 31 in its inner surface 23 forming an internal floor 32 which has an axial bore 33 therethrough, the bore 33 having a series of enlarged diameter portions 33a, 33b and 33c each defining an annular shoulder 33'a, 33'b and 33'c, respectively.

Positioned in outer casing 11 and coaxial therewith is an inner casing 35 said casings 11 and 35 being spaced to define an elongated annular gas chamber 36.

The inner casing 35 has an outer diameter substantially equal to that of recess 31, so that the end 37 of casing 35 may fit into said recess 31 abutting against the floor 32 thereof. The end 37 of casing is secured in fixed position as by welding at 38 which also provides a seal. In assembling the unit the inner casing 35 is first mounted on plate 12 to provide access for the weld at 38.

Slidably mounted in the bore 41 of inner casing 35 is a piston 42 having a piston rod 43 extending axially therefrom through the axial bore 33 in plate 12.

More particularly a fitting 44 is provided having an outer flange portion 45 from which extends axially a cylindrical sleeve portion 46 which is of reduced outer diameter at its inner end as at 47 defining an annular shoulder 48.

The sleeve portion 46 is positioned in the bore 33 of plate 12 so that its annular shoulder 48 abuts against the annular shoulder 33′a of bore 33 in which position the inner end 49 of the portion 47 of the sleeve 46 will be spaced from the end of enlarged diameter portion 33a, the clearance accommodating an "O" ring seal 51.

The flange 45 is seated on annular shoulder 33′c and the fitting 44 is secured in position as by screws 52. Desirably the outer end of the bore 53 of fitting 44 has an annular recess to accommodate a sealing member 54, the piston rod 43 extending through said bore 53.

As is shown in the drawing the bore 41 which defines a fluid chamber, may be charged with oil under pressure through a port 56 which is in communication through passageways 57, 58 and 59 in place 12 with a port 61.

As illustratively shown, the port 61 is connected by line 60 to pressure port P-1 and relief port P-2 of a valve V which may be actuated by solenoid S. The valve is of the type having a neutral closed position and two operating positions. In one operating position, port P-1 is connected through port P-1′ and pump P to reservoir R. In the second operating position, relief port P-2 is connected directly through port P-2′ to reservoir R.

The plug 13 has a cylindrical recess 63 in its inner surface 64, the side wall 63′ of said recess being beveled outwardly as shown. The diameter of the floor 65 of the recess is substantially the same as the outer diameter of end 66 of inner casing 35 so that when end 66 abuts against floor 65, a plurality of circumferentially spaced notches 67 in end 66 will provide access between the portion 41a of bore 41 of inner casing 35 to the right of piston 42 and the gas chamber 36.

The plug 13 is retained in the open end 15 of casing 11 by a retaining ring 71 externally threaded as at 72 and screwed into the correspondingly internally threaded end 15 as at 73. Preferably the retaining ring has a plurality of notches 74 in its inner periphery adapted to receive a spanner wrench (not shown).

The ring 71 is moved inwardly so that it will abut against annular shoulder 17 of plug 13 forcing the latter inwardly so that its floor 65 will press tightly against the end 66 of inner casing 35 to retain the elements in assembled relation.

To provide a seal between the plug 13 and outer casing 11, the periphery of plug 13 has an annular groove 74′ in which an "O" ring seal 75 is positioned.

As is clearly shown the outer periphery of the piston adjacent plug 13 is of slightly reduced diameter defining an annular shoulder 77. Thus even when the outer surface 78 of the piston 42 abuts against the floor 65 of plug 13, the annular shoulder 77 will be exposed to the gas pressure in chamber 36 through notches 67.

In order to provide a seal between the piston 42 and the casing 35, the piston 42 is provided with spaced annular grooves 81 in each of which a sealing member such as an "O" ring 82 is mounted.

Means are provided to detect leakage past the piston seals 82. To this end as shown, the periphery of the piston 42 has an annular groove 84 located substantially midway between the seals 82. The groove 84 is in communication through a transverse bore 85 in the piston with an axial cavity 86 thereon. The inner end 87 of piston rod 43 is secured as by welding at 88 to the inner surface 89 of the piston and extends axially therefrom, said piston rod having an axial bore 91 extending from the inner end 87 thereof which is in communication with cavity 86 to substantially the outer end of the piston rod where it is in communication with a transverse bore 92 having a port 93 at its outer end.

With the construction above described, an elongated annular gas chamber 36 is provided between the inner surface of outer casing 11 and the outer surface of inner casing 35. This chamber is charged with gas under pressure through gas valve 21 mounted in the port 19 defined at the outer end of a passageway 18 extending through plug 13 and leading into the bore portion 41a to the right of piston 42.

With the valve V controlling port 61 in the operating position connecting the reservoir R directly through port P-2 to port 61, when gas under pressure is applied to port 18 it will react against the surface 78 of piston 42 moving the piston 42 to the left and hence causing the piston rod to extend. At the same time the gas under pressure will flow through notches 67 into gas chamber 36. Consequently, the chamber 36 and the bore portion 41a may be charged with gas under pressure to a predetermined value.

Thereupon the gas valve 21 is closed and the valve V actuated to connect the outlet of pump P through pressure outlet port P-1 of the valve V to fluid port 61 of the valve actuator 10.

As a result, oil under pressure will flow through passageways 59, 58, and 57 into the bore portion 41b to the left of the piston 42, causing the piston 42 to move to the right and retracting the piston rod 43.

As a result, the gas under pressure in bore portion 41a will be further compressed as will be the gas under pressure in chamber 36 by reason of the communication provided by notches 67.

In the initial charging of the valve actuator 10 with oil under pressure if the piston seal 82a should be defective, oil will flow past the piston into annular groove 84 which initially is at atmospheric pressure. Since the initial oil pressure is greater than the gas pressure, no gas will leak into annular groove 84.

As a result of the flow of oil into annular groove 84, such oil will flow through passageway 85, cavity 86 and axial bore 91 into passageway 92 to react against a relief valve 90. This valve is set to open at a pressure higher than the gas pressure in the valve actuator at any time, but lower than the hydraulic fluid pressure.

Consequently, as a result of the oil leakage past "O" ring 82a, the valve 90 will open to either discharge oil which provides a visual indication of seal failure or to actuate an alarm.

Assuming that the seal 82a operates properly and the piston and piston rod are retracted until the piston bottoms against floor 65 of plug 13, at such time, the valve V is actuated so that it is in its neutral position cutting off further flow of oil under pressure to port 61.

Thereupon the valve actuator is in its operating position.

It is to be noted that due to the presence of piston rod 43 in bore portion 41b, the area of surface 89 of piston 42 against which the oil under pressure in bore portion 41b reacts is smaller than the area of surface 78 reacting against the gas in bore portion 41a.

Consequently, by applying the formula $F = PA$, where $F$ = Force, $P$ = Pressure and $A$ = Area, assuming that the pressure on the oil is 3000 PSI which reacts against surface 89, and that the forces reacting against both surfaces of the piston are equal, since the effective area of surface 78 is larger than the effective area of surface 89, the pressure of the gas will be less than the pressure of the oil, i.e., say 2500 PSI in the illustrated embodiment shown.

As a result of the lower gas pressure, if seal 82*b* should fail, gas will not leak past seal 82*a* into the bore portion 41*b* and even though the gas should flow into passageway 92 and react against the valve 90 it will not actuate the latter since it is set to open at a pressure higher than the compressed gas pressure.

Consequently, the system provides assurance that it will remain operative even if the gas seal 82*b* should fail and will provide an indication if the oil seal 82*a* should fail so that appropriate safety steps may be taken.

In the event of failure of the system controlled by the valve and the valve actuator herein described, through suitable control means, the solenoid valve S is actuated to connect ports P-2 and P-2' of valve V to the reservoir R.

As a result of the gas pressure in chamber 36, the piston 42 will be rapidly forced to the left, extending the piston rod 43 and closing the valve controlled thereby the oil in portion 41*b* of bore 41 discharging through port 56, passageways 57, 58, and 59, line 60, ports P-2, P-2' into reservoir R.

Having thus described my invention, what I claim as new and desire to secure by Letters Patent of the United States is:

1. A valve actuator comprising an outer cylindrical casing having a closure member at each end thereof, one of said closure members having an axial bore therethrough, an inner cylindrical casing positioned in said outer casing coaxial therewith and transversely spaced therefrom to define an elongated annular chamber with said outer casing, a piston slidably mounted in said inner casing, said piston having a piston rod extending axially therefrom through said axial bore in said one closure member, means providing communication between said annular chamber and the portion of said inner casing between the other closure member and said piston means for charging said annular chamber and the portion of said inner casing between the other closure member and said piston with gas under pressure, means to supply the portion of said inner casing between said one closure member and the piston with liquid under a pressure higher than said gas under pressure, said piston having a pair of spaced annular sealing members in its outer periphery defining seals with respect to the inner wall surface of said inner casing at least one of said pair of sealing members preventing gas leakage into the portion to be charged with liquid and means to detect liquid leakage past at least one of said pair of said sealing members, said leakage detecting means including passageway means for communicating the outer periphery of the piston between said pair of sealing members with the ambient, said passageway means including normally closed relief valve means for venting liquid in said passageway means by opening at a pressure lower than liquid pressure in said inner casing between said one closure member and the piston, said relief valve remaining closed at pressures between said gas pressure and said liquid pressure such as to prevent venting to ambient of gas leakage past another of said sealing members into said passageway means.

2. The combination set forth in claim 1 in which said other closure member is in juxtaposition to one end of said inner casing and said communication means comprises passage means extending through the wall of the inner casing near the end thereof in juxtaposition to said other closure member.

3. The combination set forth in claim 1 in which the piston is of reduced diameter at the end portion thereof adjacent said other closure member and said inner casing adjacent said other closure member has passage means therethrough providing said communication.

4. The combination set forth in claim 1 in which said other closure member is in juxtapositon to one end of said inner casing and the gas charging means comprises a gas charging passageway extending through said other closure member, the outer end of said gas charging passageway defining a gas charging port.

5. The combination set forth in claim 2 in which the outer periphery of said piston has a pair of spaced parallel annular grooves, a sealing member is positioned in each of said grooves to define a seal with respect to the inner wall surface of said inner casing, and wherein said passageway means includes an axial bore in said piston rod, and said piston has a transverse passageway extending from the outer periphery thereof to one end of said axial bore, said piston rod has a transverse bore in communication at one end with the other end of said axial bore, said transverse bore having a port at its outer end, whereby communication is provided between said port and the space between said two annular sealing members and said relief valve is positioned in said port.

6. The combination set forth in claim 1 in which a liquid supplying passageway extends through said one closure member, one end of said liquid supplying passageway leading into the portion of said inner casing between said one closure member and the piston and the other end of said liquid supplying passageway having a liquid supplying port.

7. The combination set forth in claim 6 in which valve means are provided to control said liquid supplying port, said valve means having a supplying position adapted to connect said port to a source of liquid under pressure, a neutral position closing said port and an exhaust position to permit exhaust of liquid from said portion of the inner casing between said one closure member and the piston.

8. The combination set forth in claim 1 in which said other closure member is in juxtaposition to one end of said inner casing and closes the latter, the piston is of reduced diameter at the end portion therof adjacent said other closure member, said piston being movable in said inner casing for abutment of the end thereof adjacent said other closure member against the inner surface of said other closure member, said communication means comprises passage means extending through the wall of the inner casing at the end thereof in juxtaposition to said other closure member.

9. The combination set forth in claim 7 in which a plurality of circumferentially spaced notches extend through said inner casing to define said communication means.

* * * * *